United States Patent [19]

Cook

[11] Patent Number: 4,682,954
[45] Date of Patent: Jul. 28, 1987

[54] CRYPTOGRAPHIC PROCESS AND ENCIPHERED PRODUCT

[76] Inventor: Richard C. Cook, U.S. Composite Service Group, APO 331, San Francisco, Calif.

[21] Appl. No.: 64,651

[22] Filed: Oct. 24, 1960

[51] Int. Cl.[4] ............................ G09C 5/00; G09C 1/00
[52] U.S. Cl. ........................................ 380/154; 283/17
[58] Field of Search ........................ 35/2, 3, 4; 88/24; 178/113, 22; 283/11, 17; 96/35

[56] References Cited

U.S. PATENT DOCUMENTS

| | | | |
|---|---|---|---|
| 2,952,080 | 9/1960 | Avakian et al. | 434/121 |
| 3,156,051 | 11/1964 | Hughes et al. | 434/121 |
| 3,234,663 | 2/1966 | Ferris et al. | 434/121 |
| 3,279,095 | 10/1966 | Carlson | 434/121 |
| 3,914,877 | 10/1975 | Hines | 434/121 |
| 4,586,711 | 5/1986 | Winters et al. | 434/121 |

Primary Examiner—Salvatore Cangialosi
Assistant Examiner—Aaron J. Lewis
Attorney, Agent, or Firm—George F. Westerman; Lawrence A. Neureither; Anthony T. Lane

EXEMPLARY CLAIM

1. A cryptographic process for enciphering a text sheet having pictorial intelligence thereon in the form of opaque and transparent areas comprising the steps of placing a key sheet having random alternate opaque and transparent areas in registered relation to said text, exposing a sheet of film to light passed through the key and text sheets to produce a negative having opaque areas where both the key and text sheets are transparent and transparent areas where either the key to text is opaque, placing said negative in registered relation to said text and to a second film, exposing said second film to light passed through the negative and the key to expose the second film in areas where both the key and negative are transparent, placing the text in registering relation to the negative and to said second film, exposing said second film to light passed through the negative and text to expose the second film in areas where both the text and negative are transparent, and developing the second film to produce an image which is of one character in areas where said second film has been exposed and another character in areas where said second film has not been exposed.

4 Claims, 13 Drawing Figures

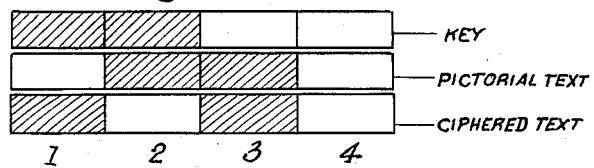
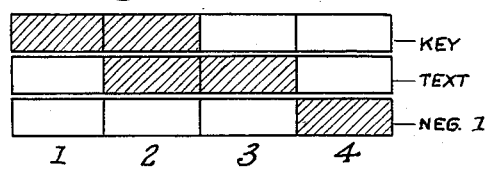
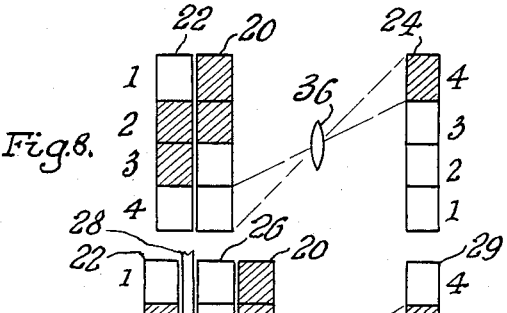
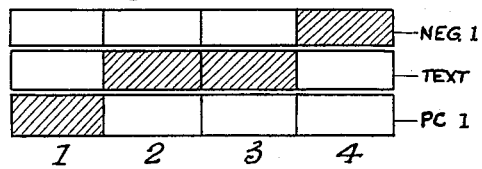
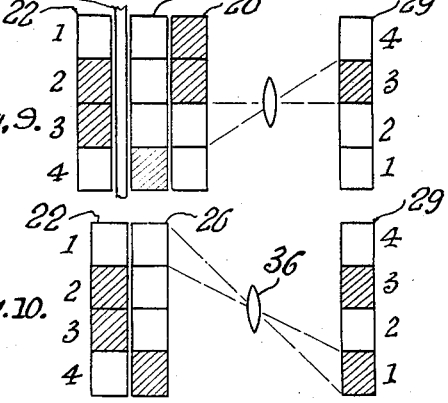
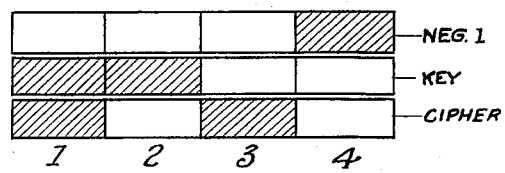
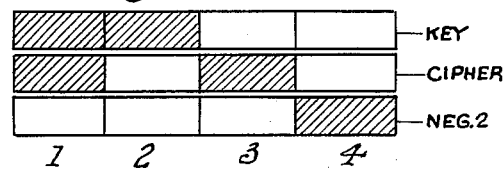
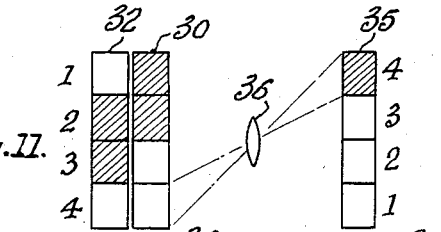
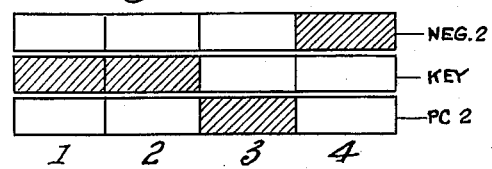
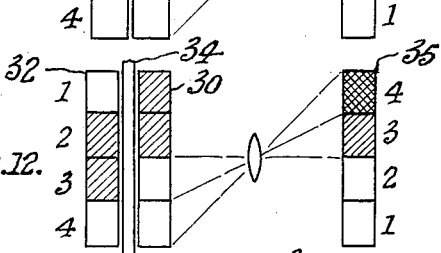
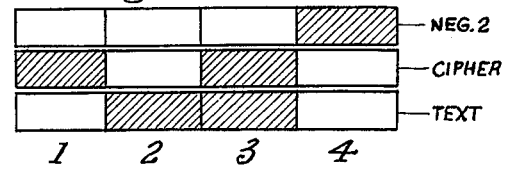
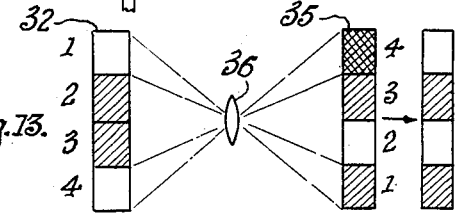

CRYPTOGRAPHIC PROCESS AND ENCIPHERED PRODUCT

The invention described and illustrated herein may be manufactured and used by or for the Government for governmental purposes without the payment of any royalty thereon.

The present invention relates to a cryptographic process and the enciphered product resulting therefrom and in particular relates to a photographic process for enciphering and deciphering an entire sheet of pictorial intelligence by means of a key overlay having alternate areas of distinguishable photographic qualities, the areas being small in size and of random placement and configuration, so that the enciphered intelligence is meaningful only to the sender and to the receiver who are in possession of duplicate copies of the key.

Heretofore cryptography has been concerned primarily with rendering intelligence unmeaningful to those not in possession of a key by enciphering individual units of intelligence. For example, written information has been enciphered or coded by enciphering each letter of a printed or written message. This procedure necessarily requires a great deal of time. Further, previous procedures are limited in the nature of intelligence which can be enciphered and transmitted. Pictorial intelligence such as maps, photographs, and entire pages of printed material in general, cannot be enciphered by previously known methods.

Therefore, the object of the present invention is to encipher an entire sheet of pictorial intelligence so that it is meaningful to the sender and to the intended receiver through the use of a key, but is unintelligible to any intermediary who might intercept the enciphered message.

Additional objects and advantages of the present invention will become obvious to those skilled in the art from a reading of the following detailed description in which:

FIG. 1 is a representation which illustrates the basic theory of the present invention;

FIGS. 2, 3 and 4 are representations illustrating the steps of one enciphering process according to the present invention;

FIGS. 5, 6 and 7 are representations showing the deciphering steps of the process of FIGS. 2, 3 and 4;

FIGS. 8, 9 and 10 are representations showing the steps of another photographic process according to the present invention; and FIGS. 11, 12 and 13 are representations showing still another photographic process according to the present invention.

The present invention is based upon the rule of binary addition or the addition according to the modulus two wherein the addition of likes equals one value and the addition of dislikes equals another value. The operation of the rule of binary addition with relation to the present invention is best seen in FIG. 1, in which the three layers represent a cross-sectional view of three sheets of material stacked in registering relation. The middle sheet has thereon any pictorial intelligence which is to be enciphered, which may comprise printed or handwritten information, pictures, maps, and the like, and is hereafter referred to as text. The darkened rectangles represent a cross section of the areas of the text which are opaque, such as printed letters, or the dark part of a picture. The unmarked rectangles of the text sheet represent the white or light areas of a picture or printed page, or the translucent or transparent areas of a film.

The uppermost sheet represents the key. The key is comprised of minute alternate areas of dark and light which are of random size, configuration and arrangement. In most cases, the key is preferably a sheet having alternate, random opaque and transparent areas so that photographic wave energy such as light will pass through the transparent areas and will not pass through the opaque areas. It is preferable that only one set of duplicate keys be made, one being retained by the sender, the other one being retained by the intended receiver. With each encipherment a different key is used. One method of producing a large number of different keys which has proven successful is to photograph a tray of minute beads approximately half of which are white and half are black. After a photograph is made of one arrangement of the beads, the tray is vibrated to rearrange the beads and another photograph made to produce a different key. Of course, an infinite number of different keys could be produced in this manner.

The ciphered text is represented by the bottom sheet. This is the physical piece of material which is transmitted from the sender to the receiver. The information on the ciphered sheet is unintelligible to any interceptor who does not have a copy of the key. The ciphered text sheet is a result of the binary addition of the areas of the key and the text. In areas where the key and the text are of similar photographic qualities, the ciphered text is of one characteristic. For example, the key and the text may both be opaque in registering areas 2 and not transmit or reflect photographic rays, and therefore would be of similar photographic qualities in that area. In registering areas 4, the key and the text may both be transparent, or one or both of light color, and would also be of similar photographic qualities. Consequently, the ciphered text is of the same characteristic in areas 2 and 4, and as illustrated in the present case, this characteristic is light color or transparent. On the other hand, in areas 1 and 3 the key and the text are of dissimilar photographic qualities. In area 1, the key is opaque and the text is light or transparent while in area 3 the key is transparent or light and the text is dark or opaque. Therefore, the ciphered text in both areas 1 and 3 is the same characteristic and this characteristic is different from the characteristic in areas 2 and 4.

The ciphered text is secure from deciphering in the hands of an interceptor who does not have a copy of the particular key used to make the ciphered text because there is a fifty-fifty possibility that any one area of the ciphered text could have been either light or dark on the corresponding area of the original text. Since each of the rectangles of the ciphered text in the illustration represents a minute area, there would be an infinite number of trial and error procedures for reproducing the original unciphered text without the aid of a key. Of course, also included within this infinite number of possible combinations would be all other pictorial representations in existence so that the interceptor would not know which pictorial message was the original text.

Generally speaking, the process for photographically adding the similar and dissimilar areas of the key and text according to the rule of binary addition comprises three steps. FIG. 1 illustrates that there are four possible combinations when a key having a binary system of photographic qualities such as opaque and transparent areas is overlayed a text having a similar binary system of photographic qualities, such as black and white. Assuming then that the photographic material of which the ciphered text is made has an original visual characteristic such as white or transparent, when unexposed, and a second distinguishable characteristic such as black or opaque when exposed, only three exposures are then necessary. One of the four areas remains the same color as the paper of the ciphered text originally which is illustrated in area 2. Steps must be taken to expose each of the other three registering areas according to the character of the key and text for that area by the rule of binary addition and each area, once processed, must be protected while the other areas are processed by techniques using a masking sheet, negative mask, or by fixing the film or by some other manner.

It is to be understood that many photographic processes and materials can be used to produce the desired images. Generally speaking, any photographic technique and material can be used so long as it uses wave form energy which can be blocked, absorbed, reflected, etc., so that the wave energy can be cancelled in certain areas to form an image on a film which is sensitive to the particular wave energy and will change to a distinguishable character which can then be fixed on the film or another sheet to perpetuate the image. It is preferred to use a dry photographic process because most wet processes tend to distort the film upon development and prevent accurate re-registration of the several sheets when necessary. Contact printing photography, conventional camera photography, reflection photography, or various combinations thereof can be used and are mentioned for illustration, it being understood that the list is not exclusive of other photographic methods.

One photographic manipulation for enciphering a text which has proven successful is illustrated in FIGS. 2, 3 and 4. In FIG. 2, a key having opaque areas 1 and 2 and transparent areas 3 and 4 is overlayed a text having transparent areas 1 and 4 and opaque areas 2 and 3. Since the text is in the form of a transparency having opaque areas and transparent areas, the contact printing method can be used. In that case, the key and the text are placed in registered relation and placed over a sheet of film and exposed to produce negative 1 which is transparent in areas 1, 2 and 3 and opaque in area 4, which is the only area where light passed through the combination key and text to strike the film. The negative is then placed over the text in registered relation as shown in FIG. 3 and over a new unexposed sheet of film. When the combination image is exposed to another sheet of film, area number 1 of the film is exposed to produce pseudo-cipher No. 1 (PC 1). The text is then removed and negative No. 1 is placed over the key and over pseudo-cipher No. 1, and all are aligned in registering relation as shown in FIG. 4. Exposure results in area 3 being exposed. The resulting film which has now received two separate exposures (commonly called a double exposure) is ciphered text, and when printed is preferably opaque in areas 1 and 3 and transparent in areas 2 and 4.

The ciphered text is then transmitted to the intended receiver who has a duplicate copy of the key. The ciphered text can then be deciphered by the same process as the text was enciphered by substituting the ciphered text for the original text. The decipherment is shown in FIGS. 5, 6 and 7. In FIG. 5, the key is overlayed the ciphered text and negative No. 2 produced. Negative No. 2 is then placed in registered relation with the key alone and pseudo-cipher No. 2 is made. Negative No. 2 is then placed in registered relation with the ciphered text and over pseudo-cipher No. 2 so that the original text is reproduced as shown in FIG. 7. Of course, in either the ciphering or deciphering process, it is immaterial in what order the last two exposures are made. Also, it will be noticed that should a negative cipher print be transmitted, the same deciphering process will produce a negative image of the text which can be positively printed to produce a copy of the original text.

Another manipulation which can be used to photographically add the images of the text and the key according to the rule of binary addition involves a dry photographic process using an electrically charged plate as film. This manipulation involves the use of a conventional type camera wherein light is reflected from an image held in the copyholder through a lens 36 and strikes the plate to expose the areas where the light strikes by draining off the electrical charge. Then a photographic image can be produced by cascading the film with a powder which is so charged as to adhere to the areas where the light did not strike or, a negative image can be produced by cascading the plate with a powder which is so charged as to adhere to the areas of the plate which are exposed to light and where the plate charge was drained off or altered.

Referring now to FIGS. 8, 9 and 10, a key 20 having alternate random areas of opaque colors indicated by the cross hatching and transparent areas indicated by the clear rectangles 3 and 4 is overlayed a text 22 having light colors in areas 1 and 4 and dark colors in areas 2 and 3. When the combined image of the key and the text is photographed, only area 4 reflects light since the text is white and the key is transparent so that corresponding area 4 of the film 24 is exposed. The film 24 is then reversed developed on an acetate sheet to produce a negative image which is opaque in area 4 and is transparent in areas 1, 2 and 3. Next the key 20 is overlayed the acetate negative 26 and the text 22 and aligned in registered relation so that the stack of sheets appears as a solid opaque or dark color. Then a white masking sheet 28 is inserted between the negative 26 and the text 22 and the "sandwich" appears in FIG. 9 is inserted in the camera. Exposure results in light being reflected from the white sheet only in area 3 so that the film 29 is exposed in area 3. Film 29 remains in the camera, and the key 20 and the white masking sheet 28 are removed so that as shown in FIG. 10 only the text 22 and the negative 26 remain in the camera. Exposure then results in light being reflected from area 1 of the text through the clear area of the negative and exposing area 1 on the film plate 29. Again the plate 29 is reverse developed to produce an image which is dark in areas 1 and 3 and light in areas 2 and 4, and this is the enciphered text. The ciphered text can be deciphered using exactly the same procedure except that the ciphered text is substituted for the plain text.

Still another manipulation which has proved successful is shown in FIGS. 11, 12 and 13. This procedure also involves the use of a conventional type camera using a charged plate film. Referring to FIG. 11, a key 30 has opaque areas 1 and 2 and transparent areas 3 and 4. The key is overlayed a text 32 having white areas 1 and 4 and dark areas 2 and 3. The composite image of the key and text is exposed and results in the exposure of area 4 of the film plate 35. The plate 35 is then removed from the camera and reverse developed so that area 4 is coated with powder and cannot again be exposed. The film plate is then resensitized. A white sheet of masking paper 34 is inserted between the key and the text. Exposure then results in light striking areas 3 and 4 of the film 35, the light being reflected from the white masking sheet. However, since area 4 has already been developed, only area 3 is affected. Next the key 30 and the white masking sheet 34 are removed from the camera as shown in FIG. 13 and the film is again exposed. Light then passes from the white area 1 of the text 32 and exposes area 1 of the film 35. Again the area 4 of the film is exposed but is not affected since it is already developed. The film 35 is then developed in the positive powder so that the powder adheres to the unexposed area 2. The film plate then has powder in areas 4 and 2 and is a negative image of the desired ciphered text. A print is then made so that areas 1 and 3 are dark and areas 2 and 4 are light and the resulting print is ciphered text for transmission. Again the ciphered text can be deciphered by the same procedure except that the enciphered text is substituted for the original text.

The photographic binary sum of a key and the pictorial text produces the enciphered text and the phtographic binary sum of the same key and the enciphered text equals the pictorial text. Therefore the phtographic manipulation for enciphering and deciphering is the same. It is to be understood that in every case a ciphered text can be deciphered by the same process and using the same or a copy of the same key that was used for enciphering the pictorial text merely by substituting the ciphered text in the steps of the process for the pictorial text. Further, regardless of which manipulation was used to produce the ciphered text, the ciphered text can be deciphered using the same key and any of the various manipulation or processes.

I claim:

1. A cryptographic process for enciphering a text sheet having pictorial intelligence thereon in the form of opaque and transparent areas comprising the steps of placing a key sheet having random alternate opaque and transparent areas in registered relation to said text, exposing a sheet of film to light passed through the key and text sheets to produce a negative having opaque areas where both the key and text sheets are transparent and transparent areas where either the key or text is opaque, placing said negative in registered relation to said text and to a second film, exposing said second film to light passed through the negative and the key to expose the second film in areas where both the key and negative are transparent, placing the text in registering relation to the negative and to said second film, exposing said second film to light passed through the negative and text to expose the second film in areas where both the text and negative are transparent, and developing the second film to produce an image which is of one character in areas where said second film has been exposed and another character in areas where said second film has not been exposed.

2. A cryptographic process for enciphering a text sheet having pictorial intelligence thereon in the form of light and dark areas comprised of placing a key sheet having random alternate opaque and transparent areas in registered relation to a text sheet, photographically producing a negative image of the key sheet and text sheet, said negative having opaque areas corresponding to the areas where the key sheet is transparent and the text sheet is light in color, aligning the key sheet, the negative and the text sheet in registered relation in that order from the shutter of a camera so that the total image is a complete dark sheet and inserting a masking sheet having a high reflectance surface between the negative and the text sheet, placing the registering sheets in a camera and photographing the composite image of the key sheet and the negative to expose a film in areas corresponding to the areas where light is reflected from the sheet of light color, removing the key sheet and the sheet of light color from the camera, photographing the composite image of the negative and the text sheet to expose said film areas where said text is of light color and said negative is transparent, and printing the double exposed film to produce a ciphered text sheet having areas of one character corresponding to registering areas where the key sheet and the text sheet are of like photographic quality and areas of a distinguishable character in registering areas where the key sheet and the text sheet are of different photographic qualities.

3. A cryptographic process for enciphering a text sheet having pictorial intelligence thereon in the form of light and dark areas comprised of placing a key sheet having random alternate opaque and transparent areas in registered relation to a text sheet, exposing the composite image of the key sheet and text sheet to a film plate to produce a negative image on the plate, developing the negative image, resensitizing the film plate, inserting a light colored masking sheet between the key sheet and the text sheet, exposing the resensitized film to the masking sheet and the key sheet, removing the masking sheet and the key sheet making a second exposure of said film to the text sheet, and making a print from said resensitized double exposed film having dark colors in areas where the film was exposed after being resensitized and light colors in other areas, thereby producing a ciphered text sheet having areas of one character corresponding to areas where the key sheet and text sheet are of similar photographic qualities and areas of a distinguishable character corresponding to areas where the key sheet and text sheet are of dissimilar photographic qualities.

4. In combination with a cryptographic process for enciphering a text sheet having pictorial intelligence thereon in the form of opaque and transparent areas comprising the steps of placing a key sheet having random, alternate, opaque and transparent areas in registered relation to said text, exposing a sheet of film to light passed through the key and text sheets to produce a negative having opaque areas where both the key and text sheets are transparent and transparent areas where either the key or text is opaque, placing said negative in registered relation to said text and to a second film, exposing said second film to light passed through the negative and the key to expose the second film in areas where both the key and negative are transparent, placing the text in registered relation to the negative and to said second film, exposing said second film to light passed through negative and text to expose the second film in areas where both the text and negative are transparent, and developing the second film to produce an image which is of one character in areas where said second film has been exposed and another character in areas where said second film has not been exposed; a cryptographic process for deciphering a ciphered text of said developed second film comprising the steps of placing said key sheet in registered relation to said enciphered text, exposing a third film to light passed through said key and said ciphered text to produce a third negative having opaque areas where both the key and ciphered text sheets are transparent and transparent areas where either the key or ciphered text is opaque, placing said third negative in registered relation to said key and to a fourth film, exposing said fourth film to light passed through said third negative and said key to expose said fourth film in areas where both said key and said third negative are transparent, placing said third negative in registered relation to said enciphered text and said fourth film, and exposing said fourth film to light passed through said third negative and said ciphered text to produce said original text.

* * * * *